United States Patent [19]  [11]  4,227,662
Fisher et al.  [45]  Oct. 14, 1980

[54] AIR TURBULENCE REDUCER

[76] Inventors: Charles B. Fisher, 2850 Hill Park Rd., Montreal, Quebec, Canada, H3H 1T1; Sidney T. Fisher, 53 Morrison, Montreal, Quebec, Canada, H3R 1K3

[21] Appl. No.: 38,483

[22] Filed: May 14, 1979

[51] Int. Cl.$^2$ ............................................. B64C 13/18
[52] U.S. Cl. .................................... 244/76 C; 244/195
[58] Field of Search ................. 244/76 R, 76 A, 76 B, 244/76 C, 194, 195; 318/580, 584; 364/434, 448

[56] References Cited

U.S. PATENT DOCUMENTS 2,621,873 12/1952 Gordon ................................ 244/76 C
2,962,243 11/1960 Coleman ............................. 244/76 C Primary Examiner—Trygve M. Blix
Assistant Examiner—Reinhard J. Eisenzopf

[57] ABSTRACT

An aircraft carries a pressure indicator well in advance, which may record barometric pressure of vertical air currents. The indicator reading is converted to electric current and averaged over a short period. The unaveraged current at a given position of the pressure indicator is recorded, delayed, read out, compared with the average current and the error current used to actuate wing flaps at the instant the wings pass over the given position, so as to adjust the wing lift for any difference in conditions as the wings move forward. Similarly the current recorded at the instant the pressure indicator was at a given point is delayed, compared with the average current at the instant the tail structure passes over the given point, and the error current is used to adjust elevators for any difference in pressure as the tail structure moves from its first position to the position of the pressure indicator at the given instant. Negative feedback may be utilized to reduce any error in the positions of the wing flaps and the tail elevator from the positions called for by the error currents.

4 Claims, 3 Drawing Figures

AIR TURBULENCE REDUCER

BACKGROUND OF THE INVENTION

On aircraft in service at the present time there are no automatic devices which compensate for rapid fluctuations of air pressure along the aircraft's route or for vertical air currents which persist for short periods of the aircraft flight. We have no knowledge of prior patent art, publication and equipment which are relevant to our invention.

BRIEF DESCRIPTION OF THE INVENTION

As an aircraft moves forward along a path with short and erratic fluctuations of air pressure or with vertical winds of substantial force but widths narrow enough to be traversed quickly, the aircraft is subjected to more or less violent vertical acceleration. In order to prevent this acceleration automatically it is necessary that rapid and accurate adjustments be made in the lift at two points well separated longitudinally on the aircraft. For the purpose of this disclosure these two points are assumed to be the center of lift of the wings and the center of lift of the rear elevator.

According to this invention, the aircraft carries a pressure indicator far enough ahead of the aircraft so that the air pressure and vertical air velocity at the location of the pressure indicator are unaffected by the aircraft. It is assumed that the aircraft is located successively in four positions. In position 1 the pressure indicator, wings and tail structure are located at points at which there was the same atmospheric pressure and no vertical air currents before the aircraft entered the area. Thus in position 1 the pressure indicator registers an average pressure and no vertical air currents, control surfaces on the wings and tail structure are stationary and the aircraft is not subject to vertical acceleration.

In position 2 the pressure indicator has entered a zone of different air pressure or a zone of vertical air currents, but the wings and tail structure of the aircraft are still in areas of the air pressure and air currents of position 1. Thus in position 2 the control surfaces of wings and tail structure are still stationary and the aircraft is not subject to vertical acceleration.

In position 3 the wings are in the location of the pressure indicator in position 2, an area of different air pressure or vertical air currents. The air pressure and currents in this zone have already been indicated by the pressure indicator, the indication has been converted to electric current, recorded, is now compared to the previous pressure reading and the error current drives the actuators for the wing control surfaces to compensate for the different conditions, at the instant the aircraft is in position 2. The tail structure is still in normal air and its control surfaces remain stationary. Thus the aircraft remains in level flight without vertical acceleration although the wings have entered an area of different air pressure or vertical air currents.

In position 4 the tail structure has moved to the location of the pressure indicator in position 2. The changed air pressure or vertical air current at this point have been previously indicated, converted to electrical current, recorded, and are now compared to the previous pressure reading. The error current drives the actuators for the tail control surfaces to compensate for the different conditions, at the instant the aircraft is in position 4. Thus the aircraft remains in level flight without vertical acceleration although the tail structure has entered an area of different air pressure or vertical air current.

This procedure has been looked at in four discrete aircraft positions but in practice proceeds continuously, with the advance information from the pressure indicator being continuously recorded, and read out and compared with a slowly varying average, at the correct instants to adjust the wing lift, and the correct instants to adjust the tail lift, to prevent short-term vertical acceleration of the aircraft. The timing of the readouts for the adjustments of the wing lift and tail lift is automatically corrected for aircraft air speed.

BRIEF DESCRIPTIONS OF THE DRAWINGS

This invention is more readily understood by reference to the following drawings.

DETAILED DESCRIPTION OF THE INVENTION

Figure 1:
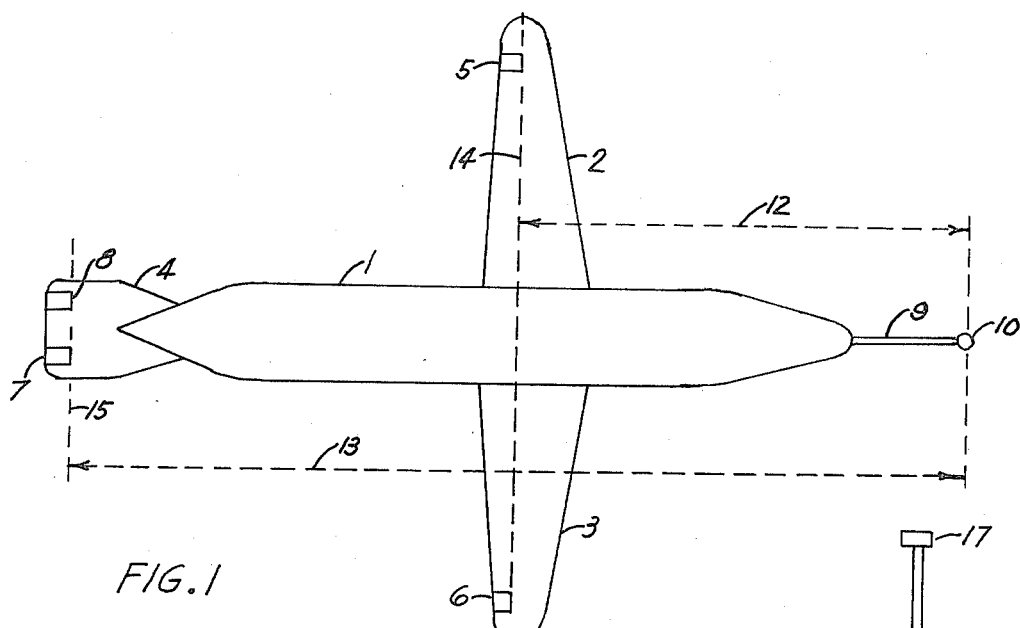
FIG. 1 shows a simplified diagram of an aircraft viewed from above, with a pressure indicator.

FIG. 1 shows a simplified diagram of an aircraft viewed from above, mounting an air turbulence reducer according to the invention. A forward extension 9 or aircraft 1 carries air pressure indicator 10. Wings 2 and 3 of aircraft 1 carry control surfaces 5 and 6 respectively, and have center of lift 14 spaced at a distance 12 from indicator 10. Tail structure 4 carries control surfaces 7 and 8 spaced at a distance 13 from indicator 10. Other parts of the air turbulence reducer not shown in FIG. 1 comprise a pressure-to-electric-current transducer, a short-term electric current averaging device, a magnetic tape recorder or other waveform delay device with at least two readouts with different delays, an aircraft speed indicator which is coupled to and changes the delays in the recorder or delay device as the aircraft air speed changes, comparison circuits for comparing each readout from the delay device with the averaged air pressure electric current, and actuators for control surfaces 5, 6, 7 and 8. Pressure indicator 10 is located ahead of the aircraft a sufficient distance that its indications are not affected by the air tubulence caused by the aircraft. Indicator 10 preferably gives readings independent of aircraft speed in smooth air. It may read ambient air pressure, or may read the velocity and direction of any vertical air current present, or separate indicators may be utilized to read each quantity. Indicating instruments with these characteristics are well known in the prior art. Indicator 10 may be positioned ahead of the aircraft body as shown or may be positioned ahead of one wing, with a second indicator if desired ahead of the other wing. Control surfaces 5 and 6 shown on wings 2 and 3 may be replaced by one or more control surfaces located on the aircraft body, preferably well forward. Similarly control surfaces 7 and 8 shown on tail structure 4 may be replaced by one or more control surfaces located on the aircraft body, preferably well aft. It is apparent that in operation the greater the distance between centers of lift 14 and 15 the more readily the aircraft can be freed from vertical acceleration.

Figure 2:
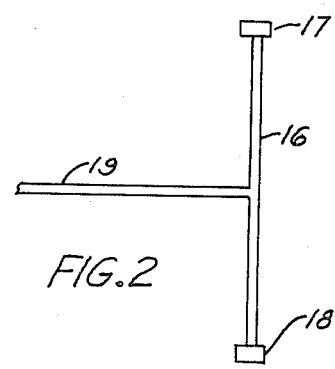
FIG. 2 shows another form of a pressure indicator.

FIG. 2 shows another form of air pressure indicator. A horizontal extension 19, which is similarly located to extension 9 in FIG. 1, carries two air pressure indicators 17 and 18, spaced vertically by rod 16. Each indicator may have a transducer, and the transducer outputs may be subtracted, so that the resultant current indicates by magnitude and polarity the velocity and direction of a vertical air current. Either transducer output alone indicates the ambient air pressure. Thus the pressure indicator of FIG. 2 indicates in advance the two types of air turbulence, areas of high or low pressure and areas of vertical air currents, which may affect vertical acceleration of an aircraft.

Figure 3:
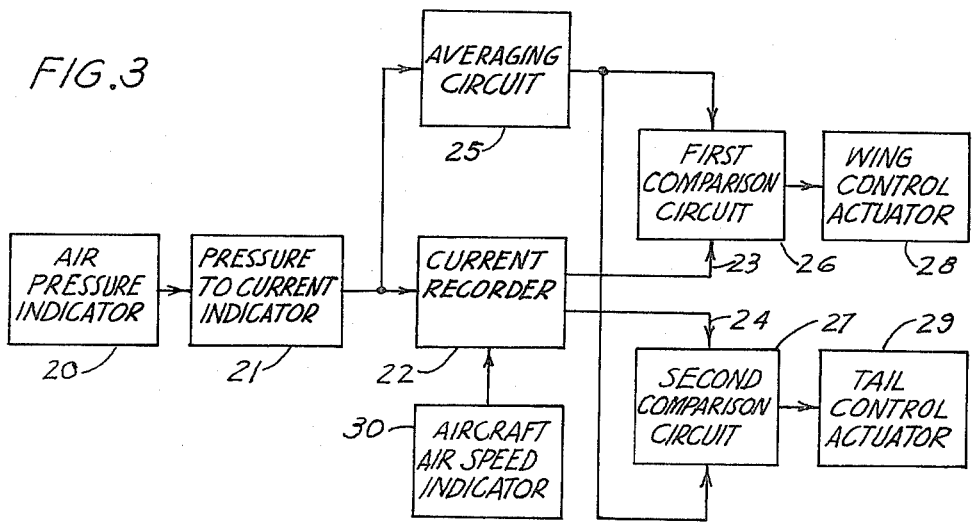
FIG. 3 shows a simplified block schematic diagram of an air turbulence reducer according to the invention.

FIG. 3 shows a block schematic diagram of the air turbulence reducer of FIG. 1, which may use as an alternative the air pressure indicator of FIG. 2. Air pressure indicator 20 located in advance of the aircraft delivers its indication to air pressure-to-electric-current transducer 21, which delivers an electric current which is a function of the air pressure indication. This current may be dc, modulated linearly or on a power or other non-linear law, by the air pressure indicator.

If the pressure indicator is recording vertical air currents the transducer may have an output of one polarlity for a rising air current and an output of the opposite polarity for a decending air current. The transducer may also produce an alternating current, linearly or non-linearly modulated in amplitude or angle or both as a function of the air pressure and air current indications.

The output of transducer 21 is recorded in current recorder 22. This has the function of a waveform delay device, with the delay available as great as the time taken for the aircraft to move through distance 13 of FIG. 1, at the lowest air speed at which the air turbulence reducer is required to function. For many aircraft this time is about 1 second. Current recorder 22 may conveniently be a loop of magnetic tape with one recording and two readout heads, coupled to an aircraft air speed indicator 30. It may also be an analog memory device in which there are two readouts at different delays, each a function of the aircraft speed, due to the coupling to indicator 30.

The current from transducer 21 is also delivered to averaging circuit 25. This may be a low-pass filter if the transducer output is dc linearly related to the air pressure indication. For currents which are other functions of the output of transducer 21 other averaging circuits well known to the prior art are required. The period of averaging required for a number of types of aircraft ranges from about one second to several minutes. Output 23 of recorder 22 is compared to the output of averaging circuit 25 in first comparison circuit 26. The relative levels of the two inputs to circuit 26 are set so that with the aircraft in level flight in non-turbulent air for several minutes there is zero output from circuit 26. If the inputs to circuit 26 are relatively altered due to the aircraft entering turbulent air an error current appears at the output of circuit 26 and drives actuator 28 for wing control surfaces 5 and 6 in a direction and an amount which compensates for the changed air conditions surrounding the wings. This compensation takes place in the time the aircraft moves the distance 12 in FIG. 1, and is controlled by the delay of output 23 of recorder 22 as modified by speed indicator 30, plus the delay of actuator 28, all shown in FIG. 3.

Similarly output 24 of recorder 22 is compared to the output of averaging circuit 25 in second comparison circuit 27. The relative levels of the two inputs to circuit 27 are set so that with the aircraft in level flight in non-turbulent air for several minutes there is zero output from circuit 27. If the inputs to circuit 27 are relatively altered due to the aircraft entering turbulent air an error current appears at the output of circuit 27 and drives actuator 29 for tail control surfaces 7 and 8 in a direction and an amount which compensates for the changed air conditions surrounding the wings. This compensation takes place in the time the aircraft moves the distance 13 in FIG. 1 and is controlled by the delay of output 24 of recorder 22 as modified by speed indicator 30, plus the delay of actuator 29, all shown in FIG. 3.

In the foregoing description of our invention we have utilized an air pressure-to-electric-current transducer, an electric current averaging circuit, an electric current delay device, electric current comparison circuits and electric control surface actuators. It is obvious to one skilled in the aircraft control art that analogous devices using hydraulic or pneumatic devices may be used to achieve the same objects as the electric devices. Also a hybrid system using one or more electric components, one or more hydraulic and one or more pneumatic devices may be used. These alternate systems do not depart from the principle of our invention.

We claim:

1. Air turbulence reducer for aircraft which comprises:

air turbulence indicator means located in advance of said aircraft at a point where the ambient air pressure and vertical currents are not materially affected by said aircraft, and transducer means which converts said air turbulence indication to an electric current which is a function of said indication, and averaging means for said current over a period longer than the time of flight of said aircraft over a distance greater than its length plus the forward extension of said indicator means, at said aircraft's lowest airborne speed, at which air turbulence reduction is desired, and recording means which records said current from said transducer and provides two or more readouts of said recorded current each with different delays, said delays being a function of the speed of said aircraft, and air speed indicator means which is coupled to said recording means, and two or more comparison means, each of which compares said averaged current with the current of one of said readouts and produces an error current, and actuator means coupled to each of said comparison means, said actuator means moving said control surface means at a time, in a direction and by an amount which compensates for the effect of turbulent air on said aircraft, said time for movement of each said actuator means being determined by a readout from said recording means, said aircraft air speed and said actuator delay at least one of said control surface means being located near the forward, and at least one near the after end, of said aircraft.

2. Air turbulence reducer according to claim 1 in which two of said control surface means are located on the elevator of the tail structure of said aircraft and one of said control surface means is located on each wing of said aircraft.

3. Air turbulence reducer according to claim 1 in which said air turbulence indicator means indicates air pressure, substantially independent of the speed of said aircraft.

4. Air turbulence reducer according to claim 1 in which said air turbulence indicator indicates vertical air currents, substantially independent of the speed of said aircraft.

* * * * *